(12) United States Patent
Tang et al.

(10) Patent No.: US 9,935,881 B2
(45) Date of Patent: Apr. 3, 2018

(54) METHOD AND APPARATUS OF LOAD SHARING

(71) Applicant: Huawei Technologies Co., Ltd., Shenzhen (CN)

(72) Inventors: Shi Tang, Shenzhen (CN); Chong Zhou, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 126 days.

(21) Appl. No.: 14/671,665

(22) Filed: Mar. 27, 2015

(65) Prior Publication Data

US 2015/0200857 A1 Jul. 16, 2015

Related U.S. Application Data

(63) Continuation of application No. PCT/CN2013/082902, filed on Sep. 4, 2013.

(30) Foreign Application Priority Data

Sep. 28, 2012 (CN) .......................... 2012 1 0367262

(51) Int. Cl.
*H04L 12/803* (2013.01)
*H04L 12/851* (2013.01)
*H04L 29/06* (2006.01)
*H04L 12/707* (2013.01)

(52) U.S. Cl.
CPC ........ *H04L 47/125* (2013.01); *H04L 47/2441* (2013.01); *H04L 69/22* (2013.01); *H04L 45/24* (2013.01)

(58) Field of Classification Search
CPC .... H04L 69/22; H04L 47/125; H04L 47/2441
See application file for complete search history.

(56) References Cited

U.S. PATENT DOCUMENTS

| | | | |
|---|---|---|---|
| 8,259,585 B1 * | 9/2012 | S P ........................ | H04L 45/125 370/237 |
| 9,049,046 B2 * | 6/2015 | Andreasen .......... | H04L 12/4633 |
| 2002/0194333 A1 | 12/2002 | Baek et al. | |
| 2005/0060414 A1 * | 3/2005 | Phillips ............... | H04L 67/1008 709/227 |

(Continued)

FOREIGN PATENT DOCUMENTS

| | | |
|---|---|---|
| CN | 1913454 A | 2/2007 |
| CN | 1937540 A | 3/2007 |

(Continued)

*Primary Examiner* — Khaled Kassim
*Assistant Examiner* — Syed S Ali
(74) *Attorney, Agent, or Firm* — Leydig, Voit & Mayer, Ltd.

(57) ABSTRACT

A method of load sharing, includes: extracting a factor field capable of distinguishing data flow in a packet header of the classified data flow, and taking the factor field as an input factor of a default load sharing algorithm of a network forwarding device interface, or taking the factor field as an input factor of a load sharing algorithm capable of uniformly allocating the data flows and selected according to the flow characteristic of the data flows, calculating the paths of the data flows, and forwarding the data flows according to respective paths. The method is used for increasing the expansibility of the network forwarding device and achieving load balancing.

8 Claims, 2 Drawing Sheets

(56) References Cited

U.S. PATENT DOCUMENTS

| | | | |
|---|---|---|---|
| 2005/0060427 A1* | 3/2005 | Phillips | H04L 67/1008 709/238 |
| 2005/0216770 A1* | 9/2005 | Rowett | H04L 63/101 726/5 |
| 2008/0107123 A1* | 5/2008 | Rune | H04L 12/5692 370/401 |
| 2009/0161696 A1* | 6/2009 | Song | H04L 43/026 370/474 |
| 2009/0217369 A1 | 8/2009 | Abeni et al. | |
| 2009/0252036 A1 | 10/2009 | Fong et al. | |
| 2010/0299517 A1* | 11/2010 | Jukic | H04L 12/2809 713/150 |
| 2011/0107082 A1* | 5/2011 | Blom | H04L 63/168 713/150 |
| 2013/0117621 A1* | 5/2013 | Saraiya | H04L 49/356 714/748 |
| 2013/0282953 A1* | 10/2013 | Orme | G06F 12/0238 711/102 |

FOREIGN PATENT DOCUMENTS

| | | |
|---|---|---|
| CN | 101102269 A | 1/2008 |
| CN | 101217455 A | 7/2008 |
| CN | 101217491 A | 7/2008 |
| CN | 101247351 A | 8/2008 |
| CN | 102170394 A | 8/2011 |
| CN | 102868631 A | 1/2013 |
| EP | 1703682 A1 | 9/2006 |

\* cited by examiner

METHOD AND APPARATUS OF LOAD SHARING

CROSS-REFERENCE TO RELATED APPLICATIONS

This application is a continuation of International Patent Application No. PCT/CN2013/082902, filed on Sep. 4, 2013, which claims priority to Chinese Patent Application No. 201210367262.2, filed on Sep. 28, 2012, both of which are hereby incorporated by reference in their entireties.

TECHNICAL FIELD

The present application relates to the field of network technologies, and in particular, to methods and apparatus for load sharing.

BACKGROUND

In an internet protocol (Internet Protocol, IP) network, in order to improve the reliability and increase the available link bandwidth, load sharing technology is often used. The specific application scenario of the load sharing technology is: after the flow of a data packet reaches a transmitted network forwarding device, one path is selected from multiple available paths according to a per-flow rule or a per-packet rule, and a corresponding data packet is forwarded to another downstream device.

The load sharing is divided into per-flow load sharing and per-packet load sharing, and the per-flow load sharing is generally adopted, in this way, all data packets of one data flow are received sequentially at a destination end without disorder may be guaranteed, and a normal service function may be guaranteed.

When performing the per-flow load sharing, the existing network forwarding device generally performs the selecting of a load sharing path for the identified packet protocol type by using a fixed flow characteristic element field method and a configurable load sharing algorithm based on a single board/an interface, on the basis that the protocol type of the packet may be identified.

Although the IP technology field has been developed for over 30 years, it is still a technical field which develops rapidly, due to the strong expansibility thereof, new protocols and new packet types endlessly emerge. In this way, the condition that the update of the online network forwarding device fails to keep pace with the development of the new protocols often exists, it is reflected in that the old online network forwarding device does not know the new packet protocol type and may only degrade to a cognitive degree to select a flow characteristic element field in the load sharing field, thus the condition of uneven load sharing under the flow-by-flow condition is often generated resulting from improper selection of the flow characteristic element field.

SUMMARY

In a first aspect, a method of load sharing includes:
extracting a factor field in a packet header of a classified data flow, wherein the factor field is used for distinguishing the data flow;
calculating path of the data flow based on a load sharing algorithm according to the classified data flow, wherein the factor field is taken as an input factor of the load sharing algorithm;
sending the classified data flow according to the path of the data flow.

In a second aspect, another method of load sharing includes:
selecting a load sharing algorithm for the data flow according to a flow characteristic of a classified data flow, wherein the load sharing algorithm is used for uniformly allocating the data flow;
calculating a path of the data flow based on the load sharing algorithm according to the classified data flow; and
sending the classified data flow according to the path of the data flow.

In a third aspect, an apparatus of load sharing includes:
an extracting unit, configured to extract a factor field in a packet header of a classified data flow, wherein the factor field is used for distinguishing the data flow, and output the factor field to a calculating unit;
the calculating unit, configured to receive the factor field from the extracting unit, calculate a path of the data flow based on a load sharing algorithm according to the classified data flow, wherein the factor field is taken as an input factor of the load sharing algorithm, and output the path of the data flow to a sending unit; and
the sending unit, configured to receive the path of the data flow from the calculating unit and send the classified data flow according to the path of the data flow.

In a fourth aspect, another apparatus of load sharing includes:
a selecting unit, configured to select a load sharing algorithm for data flow according to flow characteristic of a classified data flow, wherein the load sharing algorithm is used for uniformly allocating the data flow, and output the load sharing algorithm to a calculating unit;
the calculating unit, configured to receive the load sharing algorithm from the selecting unit, calculate path of the data flow based on the load sharing algorithm according to the classified data flow, and output the path of the data flow to a sending unit; and
the sending unit, configured to receive the path of the data flow from the calculating unit and send the classified data flow according to the path of the data flow.

In embodiments of the present application, a load sharing algorithm capable of uniformly allocating data flow is selected for the data flow according to flow characteristic of the classified data flow, and/or a factor field capable of distinguishing the data flow in a packet header of the classified data flow is taken as an input factor of the load sharing algorithm; path of the data flow is calculated according to the load sharing algorithm; and the data flow is sent according to the path, so that the expansibility of the network forwarding device is increased, and load balancing is achieved.

DESCRIPTION OF EMBODIMENTS

In order to make the purposes, technical solutions and advantages of the present application clearer, the specific embodiments of the present application will be further described below in detail in combination with accompanying drawings.

In the load sharing field, since the old online network forwarding device does not know the new packet protocol type and may only degrade to a cognitive degree to select a flow characteristic element field, the condition of uneven load sharing under the per-flow condition is often generated resulting from improper selection of the flow characteristic element field. For example, aiming at a general packet radio service tunneling protocol (General Packet Radio Service Tunneling Protocol, GTP) packet, a general packet radio service (General Packet Radio Service, GPRS) protocol is encapsulated on a user datagram protocol (User Datagram Protocol, UDP) level, if the network forwarding device could not identify GTP, it may only identify according to UDP and extract IP quintuples according to the UDP to perform load sharing, and the packets of all users carried on one GTP tunnel only have one group of IP quintuples, in this case, per-flow load sharing could not be performed on the flow of the GTP tunnel. The IP quintuple includes a destination IP address, a destination port number, a source IP address, a source port number and a protocol number.

Wherein, an IP two-tuple mainly aims at non UDP and non transmission control protocol (Transmission Control Protocol, TCP) packets and is used for distinguishing flows by adopting source IP (Source IP, SIP) and destination IP (Destination IP, DIP) fields. The IP quintuple mainly aims at UDP or TCP packets and is used for distinguishing the flows by adopting the SIP, the DIP, the protocol number, the source port number and the destination port number. When the network forwarding device is used for performing per-flow share loading aiming at multiprotocol label switching (Multiprotocol Label Switching, MPLS) packets, in order not to introduce disorder, the absolutely secure approach is to select the flow characteristic element field based on labels of every layer.

In addition, since one interface of the network forwarding device is always faced with flow models combining multiple different source addresses, different destination addresses and multiple types of protocol flows, if only one load sharing algorithm may be adopted on one interface, after the load sharing is performed on one flow, due to the differences of the flow models, the load sharing algorithm may be ineffective to other flows or may bring a worse effect.

Aiming at the defects of the load sharing method in the prior art, embodiments of the present application provide a method and an apparatus of load sharing. A load sharing algorithm capable of uniformly allocating data flow is selected for the data flow by selecting flow characteristic for a classified data flow, and/or a factor field capable of distinguishing the data flow in a packet header of the classified data flow is taken as an input factor of the load sharing algorithm; the path of the data flow is calculated according to the load sharing algorithm; and the data flow is sent according to the path, so that the expansibility of the network forwarding device is increased, and load balancing is achieved.

It should be noted that, the method and apparatus provided by the embodiments of the present application are applicable to all load sharing scenarios of forwarding based on flow.

Figure 1:
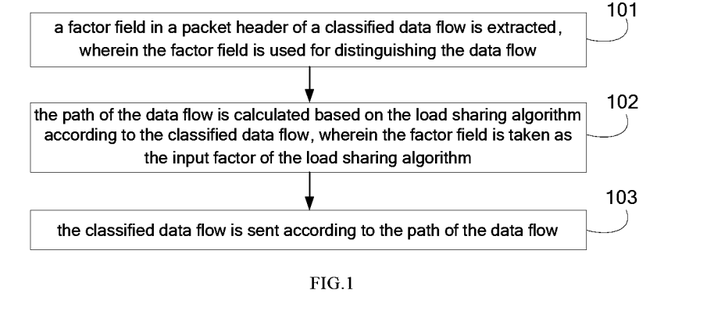
FIG. 1 is a flowchart of a method of load sharing provided by embodiment 1 of the present application.

FIG. 1 is a flowchart of a method of load sharing provided by embodiment 1 of the present application. As shown in FIG. 1, the method provided by the embodiment of the present application includes:

S101, a factor field in a packet header of a classified data flow is extracted, wherein the factor field is used for distinguishing the data flow.

Fields capable of distinguishing the data flow are extracted from the packet header of the classified data flow according to an ACL rule, these fields are called the factor field, and the factor field is taken as an input factor of a load sharing algorithm.

Optionally, the factor field herein is specifically more than one field in the packet header. Namely, the factor field may be composed of more than one field, the acquiring method of each field is: performing more than one offset beginning from the packet header, and acquiring a field during each offset, wherein the specific offset times and the offset quantity of each time may be determined according to actual demand, and how to offset multiple bytes in the packet header and acquire corresponding fields to serve as the factor field may be understood in the following corresponding action process of configuring S101 to the ACL.

Optionally, prior to S101, the method may further include a step of performing corresponding configuration to the ACL. For convenience of understanding, the action process of configuring of extracting the factor field capable of distinguishing the data flow in the packet header of the classified data flow to the ACL is illustrated firstly, and then, according to the configured ACL, how to extract the factor field capable of distinguishing the data flow in the packet header of the classified data flow and take the factor field as the input factor of the corresponding load sharing algorithm is illustrated.

The corresponding action process of configuring S101 to the ACL will be described below in detail with a GTP packet as an example.

TABLE 1 format of GTP packet

| byte | 0 | 1 | 2 | 3 | 4 | 5 | 6 | 7 |
|---|---|---|---|---|---|---|---|---|
| packet content | | | DMAC | | | | SMAC | |
| | | SMAC | | | TYPE | | IP HEAD | |
| | | | | IP HEAD | | | | |
| | | | | IP HEAD | | | | |
| | IP HEAD | | | | UDP HEAD | | | |
| | UDP HEAD | | | | GTP HEAD | | | |
| | | | GTP HEAD | | | | Data | |
| | | | | . . . | | | | |
| | | | | Data | | | | |

Table 1 is the format of the GTP packet, IP HEAD and UDP HEAD are outer layer IP/UDP headers, wherein the composition of the GTP HEAD is as shown in table 2:

TABLE 2 format of GTP HEAD in GTP packet

| byte | 0 | 1 | 2 | 3 | 4 | 5 | 6 | 7 |
|---|---|---|---|---|---|---|---|---|
| packet content | Flags | Type | Length | | | | TEID | |
| | | SQ | N-PDU | N-TYPE | | | Data | |
| | | | | . . . | | | | |
| | | | | Data | | | | |

It is assumed that, for a GTP tunnel, the source IP is 180.214.235.174, the destination IP is 223.255.226.171, and the udp source-port is 2152, since the outer layer source IP (180.214.235.174) of the GTP tunnel and the destination IP (223.255.226.171) addresses of the GTP tunnel are fixed, the port numbers of the outer layer UDP are all 2152, namely, IP two-tuples or IP quintuples of all flows in one GTP packet are the same, in this case, the flows could not be further subdivided according to the outer layer IP two-tuples or IP quintuples, and the purpose of uniformly distribute the GTP flows on different paths cannot be achieved. Therefore, according to the method provided by the embodiment of the present application, an input factor capable of distinguishing the data flows may be selected for the load sharing algorithm, namely, the ACL rule may be configured as follows:

rule 1 permit ip source 180.214.235.174 destination 223.255.226.171 udp source-port 2152 destination port 2152 load-balance matching-offset 32 length 4.

Wherein, "load-balance matching-offset 32 length 4" indicates that, during load sharing, 32 bytes may be offset backwards beginning from the IP HEAD field IP HEAD (corresponding to the 15th byte in the packet) of the packet header in the GTP packet as shown in table 1, and then the TEID fields with 4 bytes are taken as the input factor of the load sharing algorithm, since the TEID fields of the flows in the same GTP tunnel are different, taking the TEID fields as the input factor of the load sharing algorithm, the purpose of further subdividing the flows carried by the GTP tunnel may be achieved.

The above-mentioned action of configuring the input factor of the load sharing algorithm, adopts the manner of offsetting a segment of length according to the packet header and extracting a segment of length. Since in the IP network, the IP two-tuple or IP quintuple is generally adopted in load sharing, when the packet contains inner layer IP information, an inner layer IP header may be directly offset, and the IP two-tuple or IP quintuple contained in the inner layer IP header is taken as a replaced input factor of the load sharing algorithm. For example, it is assumed that data carried by the GTP tunnel contains one inner layer IP header and one UDP header. As shown in table 3:

TABLE 3 format of GTP packet containing inner layer IP header and UDP header

| byte | 0 | 1 | 2 | 3 | 4 | 5 | 6 | 7 |
|---|---|---|---|---|---|---|---|---|
| packet content | | DMAC | | | | | SMAC | |
| | SMAC | | | | TYPE | | IP HEAD | |
| | | | IP HEAD | | | | | |
| | | | IP HEAD | | | | | |
| | IP HEAD | | | | UDP HEAD | | | |
| | UDP HEAD | | | | GTP HEAD | | | |
| | | | GTP HEAD | | | | IP HEAD-1 | |
| | | | IP HEAD-1 | | | | | |
| | | | IP HEAD-1 | | | | | |
| | IP HEAD-1 | | | | UDP HEAD-1 | | | |
| | UDP HEAD-1 | | | | Data | | | |
| | | | ... | | | | | |
| | | | Data | | | | | |

Table 3 is a further subdivision of the format of the GTP packet in table 1, wherein IP HEAD and UDP HEAD are outer layer IP/UDP headers, IP HEAD-1/UDP HEAD-1 are inner layer IP/UDP headers, the IP HEAD-1/UDP HEAD-1 of the flows in the GTP tunnel are different, therefore, the ACL rule may be configured as follows:

rule 2 permit ip source 180.214.235.174 destination 223.255.226.171 udp source-port 2152 destination port 2152 load-balance matching-offset 40 as-ip.

Wherein, "load-balance matching-offset 40 as-ip" indicates that, during load sharing, 40 bytes may be offset backwards beginning from the IP HEAD field IP HEAD (corresponding to the 15th byte in the packet) of the packet header in the GTP packet as shown in table 3 to be located to the inner layer IP header (IP HEAD-1), and then the IP two-tuple or IP quintuple information of the inner layer IP header is analyzed to replace the input factor of the load sharing algorithm, since the inner layer IP two-tuples or IP quintuples of the flows in the same GTP tunnel are different, taking the inner layer IP two-tuples or IP quintuples as the input factor of the load sharing algorithm, the purpose of further subdividing the flows carried by the GTP tunnel may be achieved.

By the above-mentioned process, after the ACL action configuration is finished, if taking the above-mentioned ACL rule rule 1 as an example, when extracting the input factor of the load sharing algorithm, according to the "load-balance matching-offset 32 length 4" in rule 1, 32 bytes may be offset backwards beginning from the IP HEAD field IP HEAD (corresponding to the 15th byte in the message) of the packet header in the GTP packet as shown in table 1, and then the TEID fields with 4 bytes are taken as the input factor of the load sharing algorithm, since the TEID fields of the flows in the same GTP tunnel are different, taking the TEID fields as the input factor of the load sharing algorithm, the purpose of further subdividing the flows carried by the GTP tunnel may be achieved.

If taking the above-mentioned ACL rule rule 2 as an example, when extracting the input factor of the load sharing algorithm, according to the "load-balance matching-offset 40 as-ip" in rule 2, 40 bytes may be offset backwards beginning from the IP HEAD field IP HEAD (corresponding to the 15th byte in the packet) of the packet header in the GTP packet as shown in table 3 to be located to the inner layer IP header (IP HEAD-1), and then the IP two-tuple or IP quintuple information of the inner layer IP header is analyzed to replace the input factor of the load sharing algorithm, since the inner layer IP two-tuples or IP quintuples of the flows in the same GTP tunnel are different, taking the inner layer IP two-tuples or IP quintuples as the input factor of the load sharing algorithm, the purpose of further subdividing the flows carried by the GTP tunnel may be achieved.

S102, the path of the data flow is calculated based on the load sharing algorithm according to the classified data flow, wherein the factor field is taken as the input factor of the load sharing algorithm.

Specifically, the default input factor of the network forwarding device interface is replaced by the input factor acquired in the above-mentioned S101, and the paths of the data flows are calculated according to default load sharing algorithm of the network forwarding device interface.

If taking the above-mentioned ACL rule rule 1 as an example, when calculating the path of the data flow, the TEID fields acquired in step 101 may be taken as the input factor of the load sharing algorithm, since the TEID fields of the flows in the same GTP tunnel are different, the TEID fields are taken as the input factor of the load sharing algorithm and the purpose of further subdividing the flows carried by the GTP tunnel may be achieved. If taking the above-mentioned ACL rule rule 2 as an example, when calculating the path of the data flow, the inner layer IP two-tuples or IP quintuples acquired in S101 may be taken as the input factor of the load sharing algorithm, since the inner layer IP two-tuples or IP quintuples of the flows in the same GTP tunnel are different, taking the inner layer IP two-tuples or IP quintuples as the input factor of the load sharing algorithm, the purpose of further subdividing the flows carried by the GTP tunnel may be achieved.

In another embodiment, the load sharing algorithm may be selected for the data flow according to flow characteristic of the classified data flow, and the load sharing algorithm is used for uniformly allocating the data flow.

The load sharing algorithm herein may be an exclusive OR (XOR) algorithm or a cyclic redundancy check (Cyclic Redundancy Check, CRC) algorithm, and may also be another load sharing algorithm.

Since one interface of the network forwarding device is always faced with flow models combining multiple different source addresses, different destination addresses and multiple types of protocol flows, if only one load sharing algorithm may be adopted on one interface, after the load sharing is performed on one flow, due to the differences of the flow models, the load sharing algorithm may be ineffective to other flows or may bring a worse effect. Therefore, a corresponding load sharing algorithm may be selected for each data flow according to the classified data flow.

Optionally, at the same time of the corresponding action of configuring S101 to the ACL, an action of configuring of selecting the load sharing algorithm capable of uniformly allocating the data flow for the data flow according to the flow characteristic of the classified data flow to the ACL may further perform. For convenience of understanding, the action process of configuring of selecting the load sharing algorithm capable of uniformly allocating the data flow for the data flow according to the flow characteristic of the classified data flow to the ACL is illustrated firstly, and then, according to the configured ACL, how to select the load sharing algorithm capable of uniformly allocating the data flow for the data flow according to the flow characteristic of the classified data flow is illustrated.

Specifically, it is assumed that the default load sharing algorithm of a device is to perform uncoordinated XOR operation on the input factor, the flow load sharing of a network segment "10.1.0.0/16" is found uneven, it is found in further analysis that the flows from a source network segment "192.168.0.0/16" to a destination network segment "10.1.0.0/16" are large, the changes of the source IP addresses of these flows and destination IP addresses of packets of these flows are regular and are all expressed by simultaneous progressive increase of adding 1 on the source IP addresses and the destination IP addresses, for example, the source IP of one packet is 192.168.0.1 and the destination IP of the packet is 10.1.0.1, then the source IP of another packet is 192.168.0.2 and the destination IP of the another packet is 10.1.0.2. Since the source IP addresses and the destination IP addresses progressively increase by adding 1 at the same time, results of performing bitwise XOR on the source IP addresses and the destination IP addresses by use of the XOR algorithm are the same, therefore the flow load sharing from the source network segment "192.168.0.0/16" to the destination network segment "10.1.0.0/16" is uneven.

In the prior art, this problem is generally solved by modifying the load sharing algorithm of the entire machine, for example, the load sharing algorithm of this device is modified from the XOR algorithm to the CRC algorithm, but because only the flow load sharing from the source network segment "192.168.0.0/16" to the destination network segment "10.1.0.0/16" is uneven, if the algorithm of the entire machine is modified, other currently uniform flows will suffer from uneven load sharing due to mismatch with the CRC algorithm. Therefore, this condition may be solved by adopting the method provided by the embodiment of the present application, namely, the load algorithm of the traffic from the source network segment "192.168.0.0/16" to the destination network segment "10.1.0.0/16" is singly configured in the ACL, and the configured ACL rule is "rule 3 permit ip source 192.168.0.0 mask 255.255.0.0 destination 10.1.0.0 mask 255.255.0.0 load-balance hash-arithmetic crc".

The above-mentioned rule rule 3 indicates to replace the load sharing algorithm of the traffic from the source network segment "192.168.0.0/16" to the destination network segment "10.1.0.0/16" with the CRC algorithm.

By the above-mentioned process, after the ACL action configuration is finished, when calculating the path of the data flow, the load sharing algorithm of the flows from the source network segment "192.168.0.0/16" to the destination network segment "10.1.0.0/16" may be replaced by the CRC algorithm according to the rule rule 3 in the ACL, in order to avoid the defect that the results acquired by the XOR algorithm fail to further subdivide the flow so as to better achieve load sharing.

S103, the classified data flow is sent according to the path of the data flow.

The data flows are forwarded according to the respective calculated paths to achieve load sharing.

In the embodiment of the present application, the factor field capable of distinguishing the data flow is extracted in the packet header of the classified data flow, the factor field is taken as an input factor of the default load sharing algorithm of the network forwarding device interface, or the factor field is taken as an input factor of the load sharing algorithm capable of uniformly allocating the data flows and selected according to the flow characteristic of the data flows, the paths of the data flows are calculated, and the data flows are forwarded according to respective paths to achieve load balancing, and meanwhile, the expansibility of the network forwarding device interface may be increased.

Figure 2:
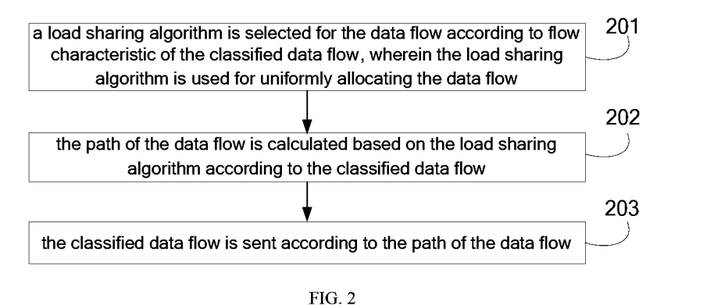
FIG. 2 is a flowchart of a method of load sharing provided by embodiment 2 of the present application.

The following embodiment describes: a load sharing algorithm capable of uniformly allocating the data flow for the data flow is selected according to the flow characteristic of the data flow, a default load sharing algorithm of the network forwarding device interface is replaced by the load sharing algorithm, a default input factor of the network forwarding device interface is taken as the input factor of the load sharing algorithm, or an default input factor of the network forwarding device interface is replaced by a new input factor, and the new input factor is taken as the input factor of the load sharing algorithm, so that the load sharing can be achieved. FIG. 2 is a flowchart of a method of load sharing provided by embodiment 2 of the present application. As shown in FIG. 2, the method provided by the embodiment of the present application includes the following steps:

S201, a load sharing algorithm is selected for the data flow according to flow characteristic of the classified data flow, wherein the load sharing algorithm is used for uniformly allocating the data flow.

Specifically, an optimal load sharing algorithm is selected for each data flow according to the flow characteristics of the classified data flow.

Optionally, prior to S201, may further include an action step of configuring of selecting a load sharing algorithm capable of uniformly allocating the data flow for the data flow according to the flow characteristic of the classified data flow to the ACL. Since the action process of configuring of selecting the load sharing algorithm capable of uniformly allocating the data flow for the data flow according to the flow characteristic of the classified data flow to the ACL and the process of selecting the load sharing algorithm capable of uniformly allocating the data flow for the data flow according to the flow characteristic of the classified data flow to the configured ACL have been illustrated in detail in the above-mentioned embodiment 1, and will not be repeated redundantly herein.

S202, the path of the data flow is calculated based on the load sharing algorithm according to the classified data flow.

Specifically, the default input factor of the network forwarding device interface is taken as the input factor of the load sharing algorithm corresponding to the data flows, and the paths of the data flows are calculated. Taking the above-mentioned ACL rule rule 3 as an example, the default input factor of the network forwarding device interface is an IP two-tuple or an IP quintuple, and the load sharing algorithm corresponding to the classified data flow is a CRC algorithm, then CRC operation is performed on the IP two-tuples or IP quintuples of the flows by the network forwarding device interface, and different paths are selected for the flows according to the operation results.

In another embodiment, a factor field capable of distinguishing the data flow in the packet header of the classified data flow may be taken as the input factor of the load sharing algorithm.

According to the ACL rule, the factor field capable of distinguishing the data flow is extracted in the packet header of the classified data flow, the factor field is taken as the input factor of the load sharing algorithm, and the purpose of performing load sharing for the data flow of the same interface is achieved.

Optionally, the factor field herein is specifically more than one field in the packet header. Namely, the factor field may be composed of more than one field, the acquiring method of each field is: performing more than one offset beginning from the packet header, and acquiring a field during each offset, wherein the specific offset times and the offset quantity of each time may be determined according to actual demand, the process of how to offset multiple bytes in the packet header and acquire corresponding fields to serve as the factor fields is described in detail in the corresponding action process of configuring S101 to the ACL in embodiment 1, and will not be repeated redundantly herein.

Optionally, prior to S201, at the time of an action of configuring of selecting the load sharing algorithm capable of uniformly allocating the data flow for the data flow according to the flow characteristic of the classified data flow to the ACL, an action of configuring of extracting the factor field capable of distinguishing the data flow in the packet header of the classified data flow to the ACL may further perform. Since the action process of configuring of extracting the factor field capable of distinguishing the data flow in the packet header of the classified data flow to the ACL, and the process of extracting the factor field capable of distinguishing the data flow in the packet header of the classified data flow according to the configured ACL and of taking the factor field as the input factor of the load sharing algorithm have been illustrated in detail in the above-mentioned embodiment 1, and will not be repeated redundantly herein.

S203, the classified data flow is sent according to the path of the data flow.

The data flows are forwarded according to the respective calculated paths to achieve load sharing.

In the embodiment of the present application, the load sharing algorithm capable of uniformly allocating the data flow is selected for the data flow according to the flow characteristic of the classified data flow; the default input factor of the network forwarding device interface is taken as the input factor of the load sharing algorithm, or the factor field capable of distinguishing the data flow in the packet header of the classified data flow is extracted, the factor field is taken as the input factor of the load sharing algorithm, the path of the data flow is calculated to achieve load sharing, and meanwhile, the expansibility of the network forwarding device interface may be increased.

Figure 3:
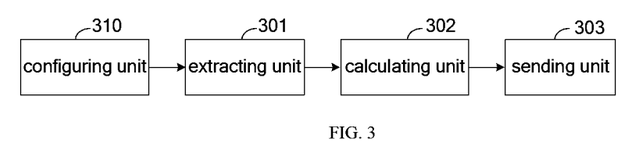
FIG. 3 is a schematic diagram of an apparatus of load sharing provided by embodiment 3 of the present application.

The above-mentioned two embodiments describe two methods of load sharing, and an apparatus embodiment of load sharing corresponding to the method of load sharing in embodiment 1 will be described in the following embodiment. As shown in FIG. 3, FIG. 3 is a schematic diagram of an apparatus of load sharing provided by embodiment 3 of the present application, and the apparatus includes: an extracting unit 301, a calculating unit 302 and a sending unit 303.

The extracting unit 301, is configured to extract a factor field in a classified data flow, wherein the factor field is used for distinguishing the data flow, and output the factor field to the calculating unit 302.

Fields capable of distinguishing the data flow are extracted in the classified data flow according to an ACL rule, these fields are called the factor field, the factor field is taken as the input factor of a load sharing algorithm, and the purpose of performing load sharing for the data flow of the same interface is achieved.

Optionally, the factor field herein is specifically more than one field in the packet header. Namely, the factor field may be composed of more than one field, the acquiring method of each field is: performing more than one offset beginning from the packet header, and acquiring a field during each offset, wherein the specific offset times and the offset quantity of each time may be determined according to actual demand, the process of how to offset multiple bytes in the packet header and acquire corresponding fields to serve as the factor fields is described in detail in the corresponding action process of configuring S101 to an ACL in embodiment 1, and will not be repeated redundantly herein.

The calculating unit 302, is configured to receive the factor field from the extracting unit 301, calculate the path of the data flow based on the load sharing algorithm according to the classified data flow, wherein the factor field is taken as the input factor of the load sharing algorithm, and output the path of the data flow to the sending unit 303.

Specifically, a default input factor of a network forwarding device interface is replaced by the input factor acquired by the extracting unit 301, and the path of each data flow is calculated according to the default load sharing algorithm of the network forwarding device interface.

In another embodiment, a load sharing algorithm capable of uniformly allocating the data flow may be selected for the data flow according to the flow characteristic of the data flow, so as to perform load sharing better.

The sending unit 303, is configured to receive the path of the data flow from the calculating unit 302 and send the classified data flow according to the path of the data flow.

The path of each data flow received from the calculating unit 302 is forwarded to achieve load sharing.

Optionally, the apparatus may further include a configuring unit 310, configured to configure an action of extracting a factor field capable of distinguishing the data flow from the packet header of the classified data flow to an ACL, and output the configured ACL to the extracting unit 301.

The configuring unit 310 may further configured to configure an action of selecting a load sharing algorithm capable of uniformly allocating the data flow for the data flow according to the flow characteristic of the classified data flow to the ACL, and output the configured ACL to the extracting unit 301.

The specific implementation processes of the functions of the units are the same as corresponding processes in embodiment 1, and will not be repeated redundantly herein.

In the embodiment of the present application, the factor field capable of distinguishing the data flow is extracted in the packet header of the classified data flow, the factor field is taken as an input factor of the default load sharing algorithm of the network forwarding device interface, or the factor field is taken as an input factor of the load sharing algorithm capable of uniformly allocating the data flows and selected according to the flow characteristic of the data flows, the paths of the data flows are calculated, and the data flows are forwarded according to respective paths to achieve load sharing, and meanwhile, the expansibility of the network forwarding device interface may be increased.

Figure 4:
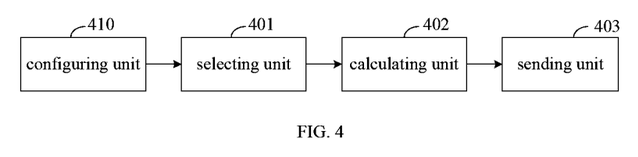
FIG. 4 is a schematic diagram of an apparatus of load sharing provided by embodiment 4 of the present application.

An apparatus embodiment of load sharing corresponding to the method of load sharing provided in embodiment 2 will be described in the following embodiment. As shown in FIG. 4, FIG. 4 is a schematic diagram of an apparatus of load sharing provided by embodiment 4 of the present application, and the apparatus includes: a selecting unit 401, a calculating unit 402 and a sending unit 403.

The selecting unit 401, is configured to select a load sharing algorithm for data flow according to flow characteristic of a classified data flow, wherein the load sharing algorithm is used for uniformly allocating the data flow, and output the load sharing algorithm to the calculating unit 402.

The calculating unit 402, is configured to receive the load sharing algorithm from the selecting unit 401, calculate the data path of the data flow based on the load sharing algorithm according to the classified data flow, and output the path of the data flow to the sending unit 403.

In another embodiment, a factor capable of distinguishing the data flow in the packet header of the classified data flow may be taken as an input factor of the load sharing algorithm, and the path of the data flow is calculated.

Optionally, the factor field herein is specifically more than one field in the packet header. Namely, the factor field may be composed of more than one field, the acquiring method of each field is: performing more than one offset beginning from the packet header, and acquiring a field during each offset, wherein the specific offset times and the offset quantity of each time may be determined according to actual demand, the process of how to offset multiple bytes in the packet header and acquire corresponding fields to serve as the factor fields is described in detail in the corresponding action process of configuring S101 to an ACL in embodiment 1, and will not be repeated redundantly herein.

The sending unit 403, is configured to receive the path of the data flow from the calculating unit 402, and send the classified data flow according to the path of the data flow.

The paths of the data flows received from the calculating unit 402 are forwarded to achieve load sharing.

Optionally, the apparatus may further include a configuring unit 410, configured to configure an action of selecting a load sharing algorithm capable of uniformly allocating the data flow for the data flow according to the flow characteristic of the classified data flow to the ACL, and output the configured ACL to the selecting unit 401.

The configuring unit 410 may further configured to configure an action of taking the default input factor of the network forwarding device interface as the input factor of the load sharing algorithm of the data flows to the ACL, and output the configured ACL to the selecting unit 401.

The specific implementation processes of the functions of the units are the same as corresponding processes in embodiment 2, and will not be repeated redundantly herein.

In the embodiment of the present application, the load sharing algorithm capable of uniformly allocating the data flow is selected for the data flow according to the flow characteristic of the classified data flow; the default input factor of the network forwarding device interface is taken as an input factor of the load sharing algorithm, or the factor field capable of distinguishing the data flow in the packet header of the classified data flow is extracted, the factor field is taken as an input factor of the load sharing algorithm, the path of the data flow is calculated to achieve load sharing, and meanwhile, the expansibility of the network forwarding device interface may be increased.

Those of ordinary skills may be further aware that, units and algorithm steps of the examples described in the embodiments disclosed in this paper may be implemented by electronic hardware, computer software, or a combination of the two, in order to clearly illustrate the interchangeability of hardware and software, the composition and the steps of the examples have been described generally in the above-mentioned illustration according to functions. Whether these functions are implemented in the form of hardware or software is determined by specific applications and design constraint conditions of the technical solutions. Those of ordinary skills may implement the described functions by using different methods for each specific application, but this implementation should not be considered beyond the scope of the present application.

The methods or the steps of the algorithm described in the embodiments disclosed in this paper may be implemented by hardware, a software module implemented by a processor, or a combination of the two. The software module may be built in a random access memory (RAM), an internal memory, a read-only memory (ROM), an electrically programmable ROM, an electrically erasable programmable ROM, a register, a hard disk, a removable disk, a CD-ROM or any other storage medium in any format known in the technical field.

The above-mentioned specific embodiments are used for further illustrating the purposes, technical solutions and beneficial effects of the present application in detail, it should be understood that, the foregoing descriptions are merely specific embodiments of the present application, rather than limiting the protection scope of the present application. Any modifications, equivalent substitutions or improvements or the like, made within the essence and principle of the present application, are all encompassed in the protection scope of the present application.

What is claimed is:

1. A method of load sharing, comprising:
   extracting, in a processor of a network device, a factor field in a packet header of a classified data flow, wherein the factor field comprises one or more fields in the packet header and the factor field is a field in the packet inner header of the classified data flow, the one or more fields are obtained by offsetting in the packet header one or more times, and the factor field is used for distinguishing a different data flow;
   calculating, in the processor, a path of the data flow based on a load sharing algorithm, wherein the load sharing algorithm is capable of distributing homogeneously the classified data flow over a plurality of different paths, wherein the factor field is taken as an input factor of the load sharing algorithm, wherein the calculating, in the processor, a path of the data flow comprises:
   selecting the load sharing algorithm for the data flow according to a flow characteristic of the classified data flow to an access control list (ACL), wherein the load sharing algorithm is used for homogeneously allocating the data flow; and calculating the path of the data flow according to the load sharing algorithm; and sending the classified data flow according to the path of the data flow.

2. The method of claim 1, wherein before the extracting a factor field in a packet header of a classified data flow, the method further comprises: configuring an action of extracting the factor field in the packet header of the classified data flow to the ACL.

3. A method of load sharing, comprising:
selecting, in a processor of a network device a load sharing algorithm for data flow according to a flow characteristic of a classified data flow, wherein the load sharing algorithm is used for homogeneously allocating the data flow;
extracting a factor field in a packet header of the classified data flow, wherein the factor field comprises one or more fields in the packet header and the factor field is a field in the packet inner header of the classified data flow, the one or more fields are obtained by offsetting in the packet header one or more times, and the factor field is used for distinguishing a different data flow; and
calculating a path of the data flow based on the load sharing algorithm, where the load sharing algorithm is capable of distributing homogeneously the classified data flow over a plurality of different paths, wherein the factor field is taken as an input factor of the load sharing algorithm, wherein the calculating a path of the data flow comprises:
selecting the load sharing algorithm for the data flow according to a flow characteristic of the classified data flow to an access control list (ACL), wherein the load sharing algorithm is used for homogeneously allocating the data flow; and
calculating the path of the data flow according to the load sharing algorithm; and
sending the classified data flow according to the path of the data flow.

4. The method of claim 3, wherein before the selecting a load sharing algorithm for data flow according to flow characteristic of the classified data flow, the method further comprises: configuring an action of selecting the load sharing algorithm for the data flow according to the flow characteristic of the classified data flow to the ACL.

5. An apparatus of load sharing, comprising a processor and a non-transitory processor-readable medium having processor-executable instructions stored thereon, wherein the processor is configured to execute the processor-executable instructions to:
extract a factor field in a packet header of a classified data flow, wherein the factor field comprises one or more fields in the packet header header and the factor field is a field in the packet inner header of the classified data flow, the one or more fields are obtained by offsetting in the packet header one or more times, and the factor field is used for distinguishing a different data flow, and output the factor field to a calculating unit;
receive the factor field from the extracting unit, calculate a path of the data flow based on a load sharing algorithm, where the load sharing algorithm is capable of distributing homogeneously the classified data flow over a plurality of different paths, wherein the factor field is taken as an input factor of the load sharing algorithm, wherein the processor is configured to execute the processor-executable instructions to calculate a path of the data flow by:
selecting the load sharing algorithm for the data flow according to a flow characteristic of the classified data flow to an access control list (ACL), wherein the load sharing algorithm is used for homogeneously allocating the data flow; and
calculating the path of the data flow according to the load sharing algorithm, and
output the path of the data flow to a sending unit; and
receive the path of the data flow from the calculating unit and send the classified data flow according to the path of the data flow.

6. The apparatus of claim 5, the processor is configured to configure an action of extracting the factor field in the packet header of the classified data flow to the ACL, and output the configured ACL action to the extracting unit.

7. An apparatus of load sharing, comprising a processor and a non-transitory processor-readable medium having processor-executable instructions stored thereon, wherein the processor is configured to execute the processor-executable instructions to:
select a load sharing algorithm for data flow according to a flow characteristic of a classified data flow, wherein the load sharing algorithm is used for homogeneously allocating the data flow, and output the load sharing algorithm;
receive the load sharing algorithm-extract a factor field in a packet header of the classified data flow, wherein the factor field comprises one or more fields in the packet header header and the factor field is a field in the packet inner header of the classified data flow, the one or more fields are obtained by offsetting in the packet header one or more times, and the factor field is used for distinguishing a different data flow, and calculate a path of the data flow based on the load sharing algorithm, where the load sharing algorithm is capable of distributing homogeneously the classified data flow over a plurality of different paths, wherein the factor field is taken as an input factor of the load sharing algorithm, wherein the processor is configured to execute the processor-executable instructions to calculate a path of the data flow by:
selecting the load sharing algorithm for the data flow according to a flow characteristic of the classified data flow to an access control list (ACL), wherein the load sharing algorithm is used for homogeneously allocating the data flow; and
calculating the path of the data flow according to the load sharing algorithm; and
receive the path of the data flow, and send the classified data flow according to the path of the data flow.

8. The apparatus of claim 7, the processor is further configured to configure an action of selecting the load sharing algorithm for the data flow according to the flow characteristic of the classified data flow to the ACL and output the configured ACL action to the selecting unit.

* * * * *